July 3, 1934.    R. J. BULLOWS    1,965,541
INDEXING MECHANISM
Filed April 23, 1932    3 Sheets-Sheet 1

July 3, 1934.  R. J. BULLOWS  1,965,541
INDEXING MECHANISM
Filed April 23, 1932  3 Sheets-Sheet 2

R. J. Bullows
INVENTOR

By: Marks & Clerk
Attys.

Patented July 3, 1934

1,965,541

UNITED STATES PATENT OFFICE 1,965,541

INDEXING MECHANISM

Richard John Bullows, Handsworth, Birmingham, England, assignor to The Gear Grinding Company Limited, Handsworth, Birmingham, England Application April 23, 1932, Serial No. 607,173
In Great Britain June 4, 1931

6 Claims. (Cl. 90—1)

This invention relates to machines for grinding or cutting gear wheel teeth, the machines being of the kind in which a relative rolling motion is produced between the grinding wheel or cutter and the work piece, the object of the invention being to provide improved indexing mechanisms for producing intermittent angular movements of the work piece.

The invention comprises the combination with a spindle which carries or is connected with the work piece, of a rack and pinion mechanism one of the elements of which consists of a pair of relatively movable parts, and continuously acting means exerting a constant turning effort on said mechanism, the arrangement being such that this effort serves to take up back-lash between the rack and pinion and also at a predetermined position to cause relative movement of the said parts for effecting the required indexing of the work piece.

In the three accompanying sheets of explanatory drawings:—

Figure 1:
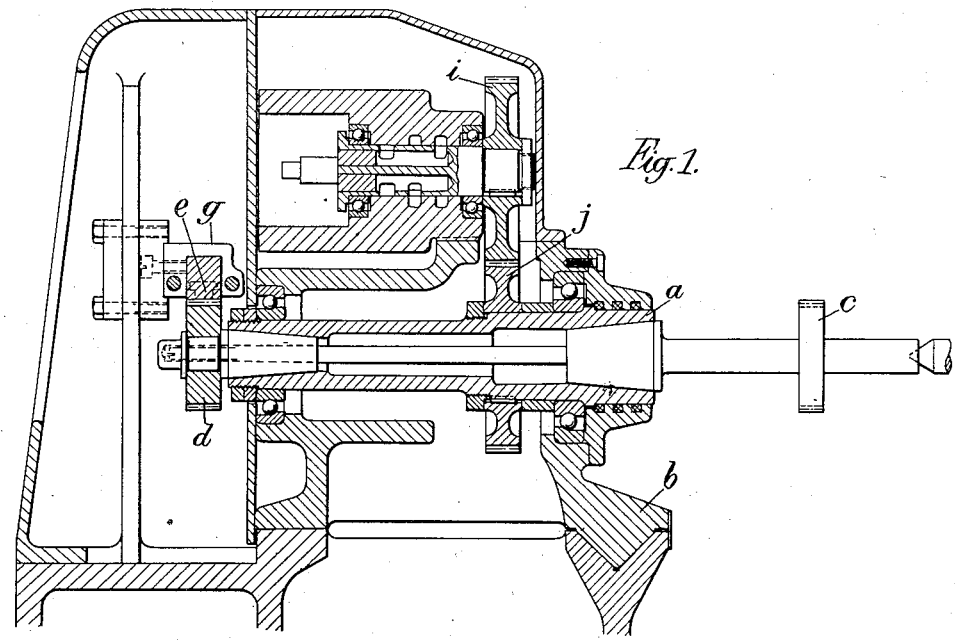
Figure 1 is a sectional end view showing part of a gear wheel tooth grinding machine provided with an indexing mechanism constructed in accordance with this invention.
Figure 2:
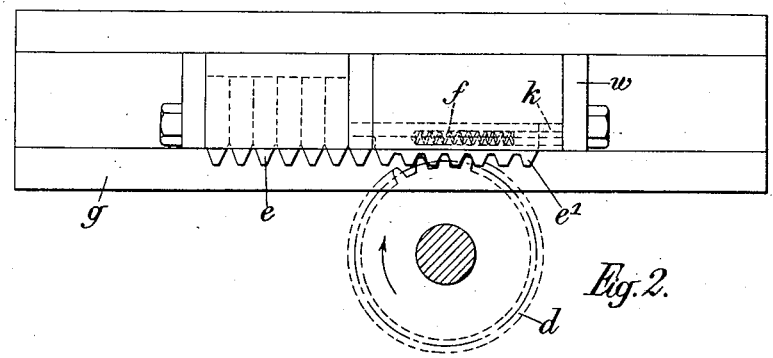
Figure 2 is a side elevation and Figure 3 an inverted plan of the two-part rack employed on the mechanism.
Figure 3:
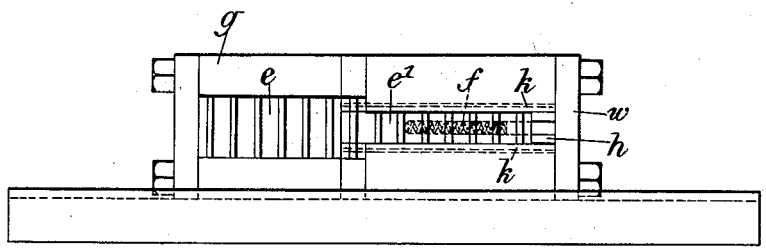
Figures 7, 8:
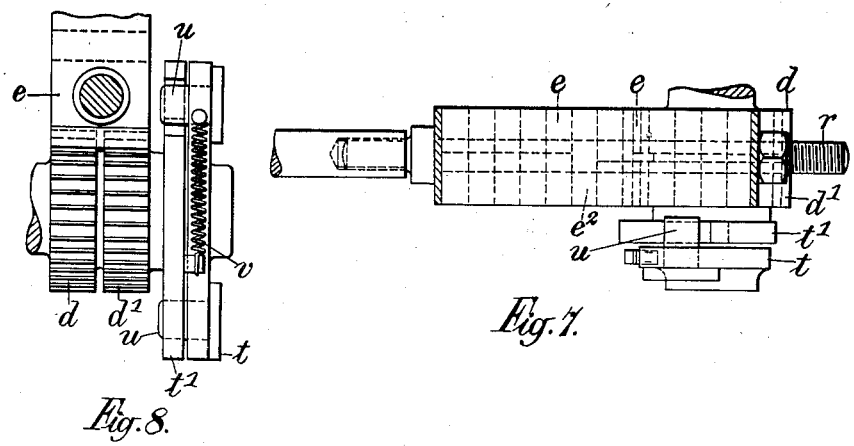
Figure 6 is an inverted plan of the rack and Figure 7 is a plan of the rack and of parts associated with the pinion.
Figure 8 is an end view of the rack and pinion.
Figure 6:
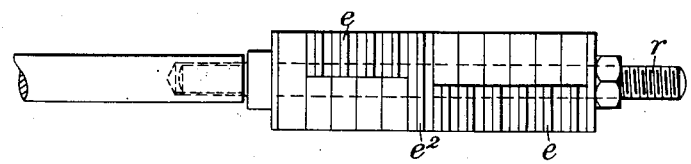

In carrying the invention into effect as shown in Figures 1–3, a spindle $a$ rotatably mounted on a slide $b$ carries at one end of it a work piece $c$ and at the other end is secured a master pinion $d$. This pinion engages a stationary master rack $e$. Movement of the pinion along the rack serves to roll the work piece relatively to a grinding wheel or cutter (not shown).

The rack consists of two relatively movable parts, one of them ($e$) being fixed to a stationary part of the machine, and the other ($e^1$) being movable relatively to $e$ against the action of a spring $f$, or weight or other suitable means, through an appropriate distance, for example, the pitch of the teeth on the work piece. These two parts are adapted to overlap at their adjacent ends so that in one position of the pinion the latter can engage one tooth of each simultaneously. In the example illustrated the fixed part $e$ of the rack is built up from a number of separate pieces each corresponding to a tooth, and these parts are clamped together to form the rack in a holder $g$ attached to a convenient stationary part of the machine. The construction of the main part of the rack from separate tooth pieces enables me to attain a high degree of accuracy in the formation of the rack, but it forms no part of the present invention. The holder $g$ is also adapted to carry the relatively slidable part $e^1$ which consists of a single piece having teeth formed along one side the other side being shaped to engage guide channels $k$ in the holder. The part $e^1$ is narrower than the part $e$, and the last tooth of the part $e$ is gapped to receive the adjacent end of the part $e^1$. The latter can slide in the holder to an extent equal to one tooth pitch, this movement being permitted by the gap $h$. Movement of $e^1$ in one direction is limited by the end piece $w$ of the holder, and in the other direction by the end of the gap in the part $e$. During the grinding operation the pinion $d$ rolls on the part $e$. When it reaches the last tooth it engages both of the parts $e$, $e^1$. Subsequently it rolls on the part $e^1$ only.

Figure 4:
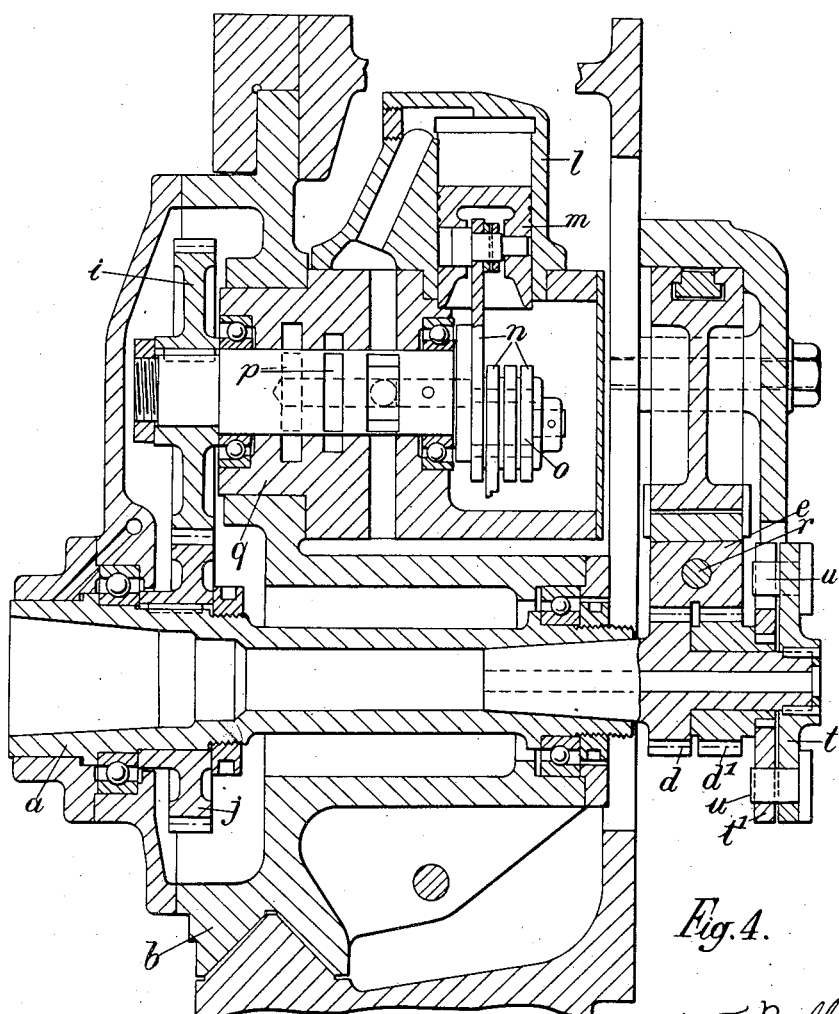
Figure 4 is a sectional end view of a part of a machine for grinding gear wheel teeth in which a two-part pinion is used in the indexing mechanism.

In association with the spindle $a$ there is arranged a fluid operated motor, spring, weight, or other suitable means whereby a constant turning or other appropriate effort is exerted always in the same direction on the spindle. In the example illustrated a fluid motor is used, this motor being illustrated in the machine shown in Figures 4 and 5. The fluid motor exerts a torque on the pinion $i$ and the torque is transmitted to the spindle $a$ through the pinion $j$. During the grinding or cutting operation this torque serves only to press the teeth of the pinion $d$ tightly against the teeth of the rack part $e$ so as to eliminate back-lash. The direction of the torque is indicated by the arrow in Figure 2 and is opposed to the direction in which the pinion rolls on the rack during the working stroke of the slide $b$.

While the pinion $d$ is rolling along the rack part $e$ the only motion given to the work piece $c$ is that required to produce the required rolling action between the work piece and grinding wheel or cutter. Towards the end of this movement the pinion $d$ passes into engagement with both rack parts $e$, $e^1$, and after the grinding or cutting operation has been completed it passes away from the rack part $e$ and engages only the part $e^1$. As this part is unable to resist the pressure due to the aforesaid turning effort exerted on the spindle $a$, it moves relatively to the part $e$ against the spring $f$ and allows the work piece to rotate through the required indexing angle. During the return of the slide the master pinion re-engages the rack part $e$, and the other part $e^1$ is returned to its initial position by the spring $f$.

Instead of employing a pair of relatively movable rack parts, I may make the master pinion from a pair of relatively movable parts controlled by a spring or other suitable means. The rack is then suitably gapped or stepped so that after the completion of the grinding or cutting operation, one of the pinion parts can pass out of engagement with the rack while the other remains in engagement, the indexing movement being effected by relative movement of the pinion parts. This form of my invention is illustrated in Figures 4–8 and will now be described more fully.

The spindle $a$ to which the work piece (not shown) is secured, is carried by a slide $b$ which is reciprocated on the fixed bed of the machine by any convenient means. Also the slide carries a multi-cylinder fluid motor $l$ the pistons $m$ of which act through rods $n$ on a crank shaft $o$. The motor is constantly subjected to fluid pressure and is tending to rotate the shaft $o$. This tendency is resisted by interaction of the rack $e$ and one of the pinion parts $d$, and can only result in partial rotation of the crank shaft at certain intervals during each working stroke of the slide as will be made apparent later. Control of the flow of fluid through the cylinder of the motor is effected by passages $p$ in the shaft bearing $q$ which passages are controlled by passages in the crank shaft. This feature forms, however, no part of my invention and need not be further described. The shaft $o$ transmits its torque to the spindle $a$ through the pinions $i, j$.

On the fixed part of the machine is mounted the rack $e$. It will be seen on reference to Figure 6 that this rack consists of two parts which are not in alignment with each other. The adjacent ends of the rack parts are formed by a tooth $e^2$ which is common to both parts of the rack. The rack is built up from separate pieces as above described, and the pieces are held together by a bolt $r$. The pinion consists of two parts as already mentioned. One of them ($d$) is secured to the work spindle $a$, whilst the other ($d^1$) is rotatably mounted on the boss $d$ (see Figure 4). To the boss of $d$ is secured a plate $t$ and to the boss of $d^1$ is secured a plate $t^1$. The relative angular movement which can occur between the pinion parts $d$, $d^1$ is limited by pegs $u$ on the plate $t^1$ engaging short slots in the plate $t$. The movement is resisted by a spring $v$ having its ends attached to the plates $t$, $t^1$ (see Figures 5 and 8).

Figure 5:
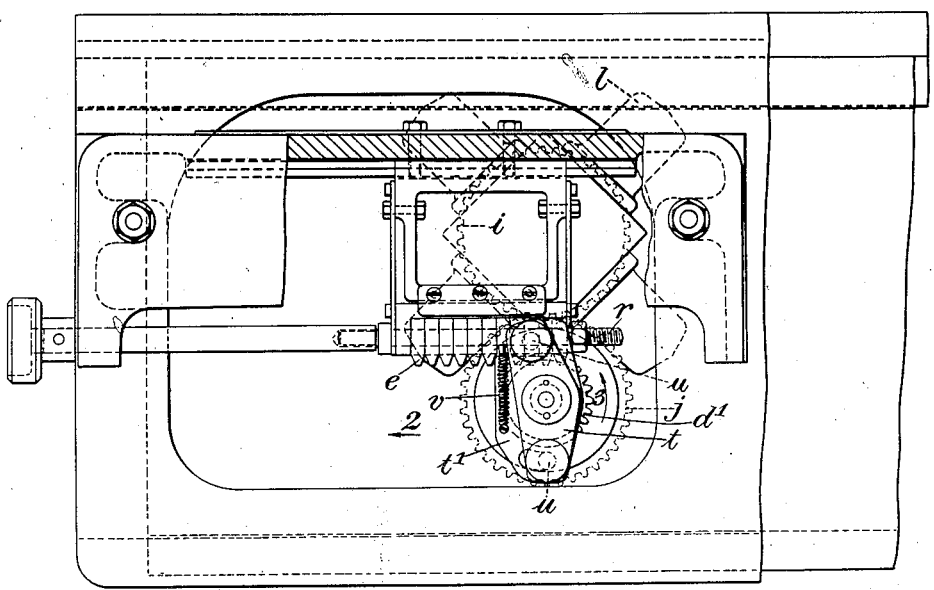
Figure 5 is a rear view of the same.

Starting with the parts in the position shown in Figure 5, the slide carries the work spindle in the direction of the arrow 2 and the fluid motor $l$ exerts a torque tending to turn the pinion $d$ in the direction of the arrow 3, though the pinion will actually turn in the opposite direction due to its interaction with the rack. During the initial part of the slide, and while the work piece is under the action of the grinding wheel, the pinion part $d$ only is active, as the part $d^1$ does not then engage the rack. Towards the end of this movement both pinion parts engage the common rack tooth $e^2$. Subsequently the pinion part $d$ leaves the portion of the rack with which it co-operates and the pinion part $d^1$ engages the other part of the rack. The spindle $a$ is now free to respond to the torque exerted by the motor $l$, and the spindle $a$ together with the pinion part $d$ turns relatively to the part $d^1$ to an extent dependent on the length of the slots in the plate $t$ against the action of the spring $v$. In this way the work piece is advanced through an angle equal to a tooth pitch in readiness for the next grinding or cutting operation. During the return of the slide the part $d$ re-engages its part of the rack, and the part $d^1$ returns to its normal position under the action of the spring.

The invention is not limited to the examples above described as subordinate details can be varied in a number of ways to suit different requirements. Thus, the work piece and master pinion can be carried on separate interconnected spindles. Also the axis of the work spindle may be fixed, and movement given to the grinding wheel or cutter and the rack. But in all cases the relative movement between the rack or pinion parts is effected by an effort constantly applied to the rack and pinion mechanism, which effort only becomes operative for producing relative movement of the rack or pinion parts during the indexing period, its purpose during the grinding or cutting period being to eliminate back-lash.

Having thus described my invention what I claim as new and desire to secure by Letters Patent is:—

1. In indexing mechanism for gear wheel teeth grinding and cutting machines, the combination with a spindle which carries or is connected with the work piece, of a rack and pinion mechanism one of the elements of which consists of a pair of relatively movable parts, and continuously acting means exerting a constant turning effort on said mechanism, to cause relative movement of said parts at some predetermined position for effecting the required indexing of the work piece.

2. An indexing mechanism as claimed in claim 1, in which the rack element consists of a pair of relatively slidable and spring controlled parts mounted on a stationary support, and in which the pinion is carried on the reciprocatory work spindle, the means exerting the constant torque being arranged to act on the spindle, substantially as described.

3. An indexing mechanism as claimed in claim 1, in which the rack element consists of a pair of parts arranged out of alignment with each other, and the pinion comprises a pair of relatively movable and spring controlled parts engaging the rack, the pinion being mounted on the reciprocatory work spindle, the means exerting the constant torque being arranged to act on the spindle, substantially as described.

4. An indexing mechanism for gear wheel teeth grinding and cutting machines comprising the combination with the work spindle, of a rack and pinion mechanism one of the elements of which consists of a pair of relatively movable parts, the pinion element being mounted on the spindle, and a fluid operated motor operatively associated with the work spindle and exerting a constant turning effort thereon to cause relative movement of said parts at some predetermined position for effecting the required indexing.

5. An indexing mechanism as claimed in claim 4 in which the rack element comprises a pair of relatively slidable and spring controlled parts arranged in alignment and having tooth members simultaneonsuly engageable with the pinion element.

6. An indexing mechanism as claimed in claim 4 in which the pinion element comprises a pair of coaxial, relatively movable and spring controlled parts and in which the rack element consists of a pair of parts out of alignment with each other and having a common tooth.

RICHARD JOHN BULLOWS.